United States Patent [19]
Hayashi et al.

[11] Patent Number: 5,224,777
[45] Date of Patent: Jul. 6, 1993

[54] CRYOGENIC MEASUREMENT EQUIPMENT

[75] Inventors: Soichiro Hayashi; Masami Simizu; Katsuto Ishii; Yoshio Tanaka; Hiroyasu Okamura, all of Tokyo, Japan

[73] Assignee: Kabushiki Kaisha Toshiba, Kawasaki, Japan

[21] Appl. No.: 872,186

[22] Filed: Apr. 22, 1992

[30] Foreign Application Priority Data

Apr. 23, 1991 [JP] Japan ................................. 3-119472

[51] Int. Cl.$^5$ ........................... G01K 7/00; G01K 7/16
[52] U.S. Cl. ..................................... 374/172; 374/183; 374/163; 364/557; 340/584
[58] Field of Search ............... 374/163, 166, 170, 171, 374/172, 176, 183; 364/557, 577, 571.01, 571.03; 340/584

[56] References Cited

U.S. PATENT DOCUMENTS

| | | | |
|---|---|---|---|
| 4,122,719 | 10/1978 | Carlson et al. | 374/172 |
| 4,161,880 | 7/1979 | Prosky . | |
| 4,210,024 | 7/1980 | Ishiwatari et al. | 374/171 |
| 4,298,947 | 11/1981 | Tamura et al. | 374/170 |
| 4,403,296 | 9/1983 | Prosky | 374/166 |
| 4,455,095 | 6/1984 | Bleiker | 364/557 X |
| 4,481,596 | 11/1984 | Townzen | 374/172 |
| 4,532,601 | 6/1985 | Lenberking | 364/557 X |
| 5,139,858 | 8/1992 | Beamish et al. | 374/183 |

FOREIGN PATENT DOCUMENTS

| | | | |
|---|---|---|---|
| 2951627 | 7/1981 | Fed. Rep. of Germany | 374/171 |
| 3321862 | 12/1984 | Fed. Rep. of Germany | 374/171 |
| 4018281 | 12/1990 | Fed. Rep. of Germany . | |
| 2088066 | 1/1972 | France . | |

OTHER PUBLICATIONS

Patent Abstracts of Japan, vol. 10, No. 9, (P-420)[2066], Jan. 14, 1986, & JP-A-60 165 527, Aug. 28, 1985, T. Yoshihara, "Temperature Measuring Circuit".
Patent Abstracts of Japan, vol. 7, No. 142, (P-205)[1287], Jun. 22, 1983, & JP-A-58 55728, Apr. 2, 1983, K. Yamamura, et al., "Detecting Circuit For Temperature Difference".
Toute L'Electronique, No. 537, Oct. 1988, pp. 46-50, R. Besson, "Les Thermistances A Coefficient de Temperature Negatif".

Primary Examiner—William A. Cuchlinski, Jr.
Assistant Examiner—G. Bradley Bennett
Attorney, Agent, or Firm—Oblon, Spivak, McClelland, Maier & Neustadt

[57] ABSTRACT

A temperature measurement equipment in which the accuracy of temperature measurement is improved by smoothly connecting the characteristic curves measured by two sensors having different characteristics, and dividing the characteristic curve into a plurality of curves, in particular in the vicinity of 4 K., digital processing being performed with a set resolution for each of these divided regions.

8 Claims, 10 Drawing Sheets

|  | 4 ~ 30 (K) BY TABLE No.1 | 4 ~ 8 (K) BY TABLE No.1 8 ~ 30 (K) BY TABLE No.2 | 4 ~ 8 (K) BY TABLE No.1 8 ~ 18 (K) BY TABLE No.2 18 ~ 30 (K) BY TABLE No.3 | 4 ~ 8 (K) BY TABLE No.1 |
|---|---|---|---|---|
| ACCURACY AT 8 (K) | 0.036% | 0.032% | 0.032% | 0.032% |
| ACCURACY AT 18 (K) | 0.511% | 0.064% | 0.056% | 5.190% |
| ACCURACY AT 30 (K) | 1.752% | 0.220% | 0.029% | 6.000% |

*FIG. 13*

CRYOGENIC MEASUREMENT EQUIPMENT

BACKGROUND OF THE INVENTION

1. Field of the Invention

This invention relates to a cryogenic temperature measurement equipment that performs cryogenic temperature measurement. In particular, it relates to a cryogenic temperature measurement equipment adapted for temperature measuring to ensure safe operation of a super-conducting coil cooled by liquid helium.

2. Description of the Related Art

Conventionally, to make measurements from room temperature of 300 K. (27° C.) to the vicinity of 4 K. (−269° C.) in a strong magnetic field, measurement was performed by two sensors having different characteristics. Specifically, first of all, from room temperature to 30 K. (−243° C.), temperature was measured using a platinum temperature measurement resistance (Pt) sensor. Then, from 30 K. (−243° C.) to 4 K. (−269° C.), temperature was measured using a carbon glass resistance (CGR). Both of the above types of sensors have nonlinear resistance versus temperature characteristics, so a linear approximation is made by a plurality of broken lines. In the vicinity of 30 K., where the sensitivity is poor, accuracy therefore had to be increased by increasing the number of broken lines. However, in the conventional measurement equipment, measurement accuracy was poor, due to temperature drift resulting from measurement using analog amplification circuitry from the sensor input to the final output. Also, since two sensors having different characteristics were employed for the measurement, at the sensor transfer point in the vicinity of 30 K., different measured values were output by the two sensors, resulting in a discontinuity of the characteristic curves at the transfer point. Measurement accuracy was particularly poor in the vicinity of 4 K., between 4 and 30 K.

SUMMARY OF THE INVENTION

The object of this invention is to provide cryogenic temperature measurement system in which temperature is measured continuously between room temperature and cryogenic temperature by two sensors having different characteristics, and wherein the accuracy of temperature measurement can be improved. In order to achieve the above object, in this invention, in a cryogenic temperature measurement equipment that performs measurement from room temperature to cryogenic temperature, the temperature between room temperature and a pre-set temperature is measured by a first measurement means. When said pre-set temperature is reached, the output values measured by said first measurement means are smoothly connected, maintaining a fixed temperature width, to the output values measured by a second measurement means. Further, in the output values that are output by temperature measurement from room temperature to cryogenic temperature, the accuracy of temperature measurement can be further improved by dividing temperature the vicinity of 4 K. into a plurality of ranges and performing digital processing with a set resolving power for each of these divided regions.

DESCRIPTION OF THE PREFERRED EMBODIMENTS

Figure 1:
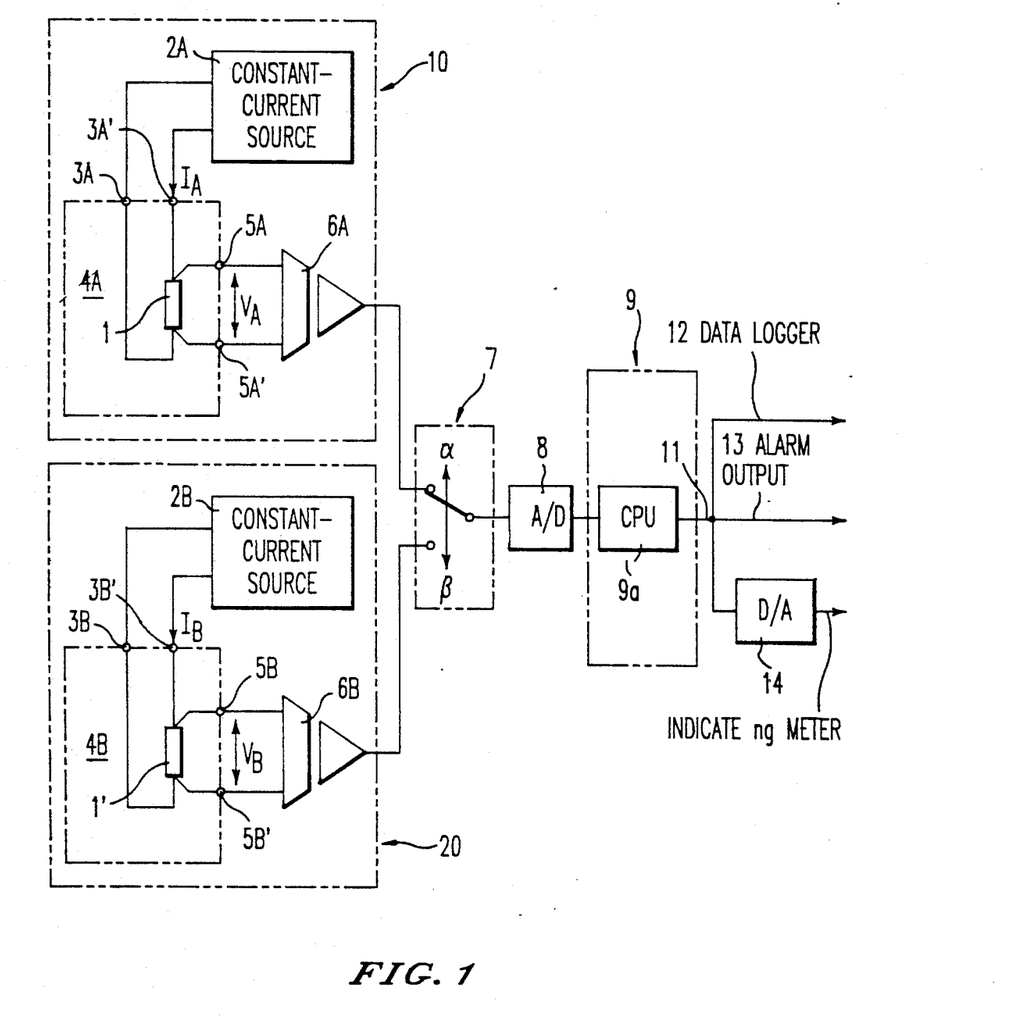
FIG. 1 is a schematic diagram of an embodiment of a cryogenic temperature measurement equipment according to this invention.

A first embodiment of this invention is described with reference to the drawings. FIG. 1 is a schematic diagram of a cryogenic temperature measurement equipment according to a first embodiment. In a measurement circuit 10 of FIG. 1, temperature is measured from 300 K. down to 30 K. This circuit has the following features. Constant-current source 2A supplies DC current IA to terminals 3A and 3A' of a cryogenic temperature cooling cryostat 4A. A Pt sensor 1 is thermally isolating from the atmosphere by a doublelayered cryostat liquid nitrogen (temperature: 77 K.) and liquid helium (temperature: 4.2 K.), and generates an output voltage VA between voltage terminals 5A and 5A' in response to DC current IA supplied from the constant-current source 2A. Isolating amplifier circuit 6A receives the output voltage VA generated between voltage terminals 5A and 5A' and outputs an output voltage amplified up to a specified signal level. This output voltage changes in response to change of temperature because the resistance of the Pt sensor 1 changes. Second measurement circuit 20 measures the temperature from 30 K. to 4 K. It is constructed as follows. Constant-current source 2B supplies DC current IB to the current terminals 3B and 3B' of a cryogenic temperature cooling cryostat 4B. The CGR sensor 1' is thermally isolated from the atmosphere by a doublelayered cryostat of liquid nitrogen (temperature: 77 K.) and liquid helium (temperature: 4.2 K.), and generates an output voltage VB between voltage terminals 5B and 5B' in response to DC current IB that is supplied from the constant-current source 2B. Isolating amplifier circuit 6B receives this output voltage VB generated across voltage terminals 5B and 5B' and outputs the output voltage amplified up to a specified signal level. This output voltage changes in response to change of temperature because the resistance of the CGR sensor 1' changes. To effect measurements between 300 K. and 30 K., a measurement circuit switch 7 transfers to α, so that the first measurement circuit 20 is employed for measurement. To effect measurements between 30 K. and 4 K., the measurement circuit switch 7 transfers to β to perform measurements by means of the second measurement circuit 20. The A/D converter 8 converts the analog output voltages from the first measurement circuit 10 and the second measurement circuit 20 to a digital voltage signal. The digital voltage signal from the A/D converter 8 is linearized by means of a CPU 9a in a digital circuit 9 and converted into an output value (0 to 100%) in accordance with the temperature 0 to 300 K.

Figure 6:
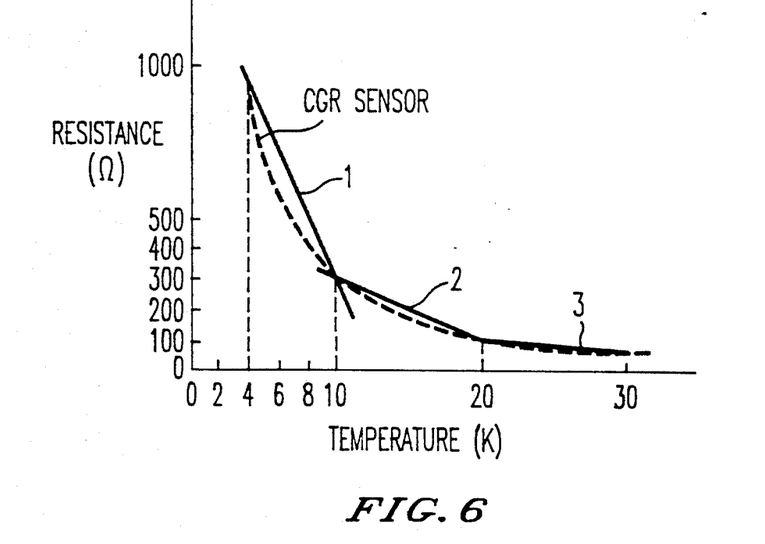
FIG. 6 is a graph showing the characteristic curve of a carbon glass sensor of the cryogenic temperature measurement equipment shown in FIG. 1, and a linear approximation processing diagram.

The linearization processing will now be described with reference to FIG. 6, using the characteristic curve of the CGR sensor 1'. The dotted line shown in FIG. 6 illustrates the characteristic curves from 30 K. to 4 K. of the CGR sensor 1' employed by the second measurement circuit 20. This characteristic curve is linearly approximated by three solid broken lines in the three temperature regions: 4 K. to 10 K., 10 K. to 20 K., and 20 K. to 30 K. As shown in FIG. 1, the digital output values 11 that are output from the digital circuit 9 are input to a data logger 12, an alarm output 13, and are displayed in analog form by means of the D/A converter 14. However, due to the differences in characteristic curve of the Pt sensor 1 provided in the first measurement circuit 10 and the CGR sensor 1' provided in the second measurement circuit 20, the linearized output values generated in response to temperature are different, depending on the different resistance values that are output from the two circuit 10 and 20. The correction action in the vicinity of 30 K. at which the measurement circuit switch 7 operates is described below.

First of all, the correction action during fall of temperature will be described with reference to FIGS. 2, 3, 4. The temperature measured by the Pt sensor 1 of the first measurement circuit 10 is output from room temperature to 30 K. At the point when the temperature measured by the Pt sensor 1 reaches 30 K., the measurement circuit switch 7 is transferred from α to β, so that measurement is performed by the CGR sensor 1' of the second measurement circuit 20. First of all, the output voltage VA across these voltage terminals 5A and 5A' of the Pt sensor 1 at temperature 30 K. (point A) is read off by the isolating amplifier circuit 6A. Then, output voltage VA is amplified up to a set level by the insulated amplifier circuit 6A, and is converted to a digital voltage signal by means of the measurement circuit switch 7 and the A/D converter 8. This digital voltage signal is input to the digital circuit 9, where it is converted to T30Pt (%), which is an output value corresponding to this digital voltage signal. Likewise, the output value corresponding to the temperature measured by the CGR sensor 1' at this time-point (point B) is designated as T30CGR (%). The difference in the two output values (%) at this point is then $$d1 = T30Pt - T30CGR.$$

If correction processing is carried out such that this difference d1 becomes 0 over the period from 30 K. to 25 K., the amount of change ΔT with respect to the temperature of the converter output is:

$$\Delta T = \frac{T30Pt - T30CGR}{30 - 25}$$

Since this correction value changes with temperature, it is calculated as follows by the CPU 9a in the digital circuit 9. Expressing the correction value TD (%) at temperature X (K.) as:

$$TD = \frac{(X - 25)(T30Pt - T30CGR)}{30 - 25} \quad (1)$$

and representing the output value measured by the CGR sensor 1' at temperature X (K.) as TXCGR (%), the corrected output value TD' (%) is:

$$TD' = TXCGR + \frac{(X - 25)(T30Pt - T30CGR)}{30 - 25} \quad (2)$$

Between 30 K. and 25 K., the measurement circuit switch 7 of FIG. 1 is alternately transferred between α and β with a sampling period of about 100 ms, so that the values measured by the Pt sensor 1 and the CGR sensor 1' are read. Then, the measured value of the Pt sensor 1 is corrected by means of the correction value TD of the above expression (1) such that it coincides with the measured value of the CGR sensor 1'. Then, when in FIG. 3 temperature of 25 K. (point C) at which TD'=T25CGR is reached, by transferring the measurement circuit switch 7 from α to β, subsequently measurement is performed by the CGR sensor 1' up to the vicinity of 4 K. For example, if temperature X(K.) is 30 K., $$TD' = T30CGR + \frac{5}{5}(T30Pt - T30CGR)$$
$$= T30Pt$$

If temperature X (K) is 25 K., $$TD' = T25CGR + 0$$
$$= T25CGR$$

Thus the output of the converter becomes continuous with a fixed width (from 30 K. to 25 K.) that is predetermined from the set temperature 30 K. Next, the correction action during temperature rise will be described with reference to FIG. 2. In the case of temperature rise, the action is the opposite of that when the temperature is falling, and an output value is output corresponding to the temperature measured by the CGR sensor 1' from 4 K. to 30 K. When the output value measured by the CGR sensor 1' reaches a value corresponding to the temperature of 30 K., the measurement circuit switch 7 transfers from β to α so that the measurement is also performed by the Pt sensor 1. First of all, the isolating amplifier circuit 6B reads the output voltage 4B across these voltage terminals 5B and 5B' of CGR sensor 1' at the temperature 30 K. (point B). Output voltage VB is then amplified up to a set level by the isolating amplifier circuit 6B, and a digital voltage signal is output by means of the measurement circuit switch 7 and the A/D converter 8. The digital circuit 9 inputs the digital voltage signal of the A/D converter 8 measured by the CGR sensor 1' and converts it to T30CGR (%), which is the output value corresponding to this digital voltage signal. Likewise, let the output value corresponding to the temperature measured by the Pt sensor 1 at this time point (point A) be T30Pt (%). The difference of the two output values is then $$d2 = T30Pt - T30CGR.$$

The amount of change ΔT of the converter output with respect to temperature, when correction processing is performed such as to make this difference d2 have a value of 0 from 30 K. to 35 K. is:

$$\Delta T = \frac{T30Pt - T30CGR}{35 - 30}$$

The correction value changes with change of temperature, so it is calculated as follows by the CPU 9a in the digital circuit 9. The correction value TU (%) at temperature X (K.) is expressed by:

$$TU = \frac{(X - 35)(T30Pt - T30CGR)}{35 - 30} \qquad (1)'$$

If the output value measured by the Pt sensor 1 at temperature X (K.) is represented by TXPT (%), the corrected output value TU (%) is expressed by:

$$TU' = TXPt + \frac{(X - 35)(T30Pt - T30CGR)}{35 - 30} \qquad (2)'$$

In the interval from 30 K. to 35 K., the measurement circuit switch 7 of FIG. 1 is alternately transferred between α and β with a sampling period of about 100 ms, so that the values measured by the Pt sensor 1 and the CGR sensor 1' are read. The effect of the correction value TU of equation (1)' above is to make the measured value of the CGR sensor 1' follow i.e. coincide with the measured value of the Pt sensor. Thus, when the temperature 35 K. (point D) is reached, at which in FIG. 2 TU' = T35Pt, the measurement circuit switch 7 transfers from β to α, and subsequently measurement is effected by the Pt sensor 1 up to room temperature.

For example, if temperature X (K) is 30 K., $$TU = T30Pt + \frac{-5(T30Pt - T30CGR)}{5}$$
$$= T30CGR$$

If temperature X (K) is 35 K., $$TU = T35Pt + 0$$
$$= T35Pt$$

Figure 4:
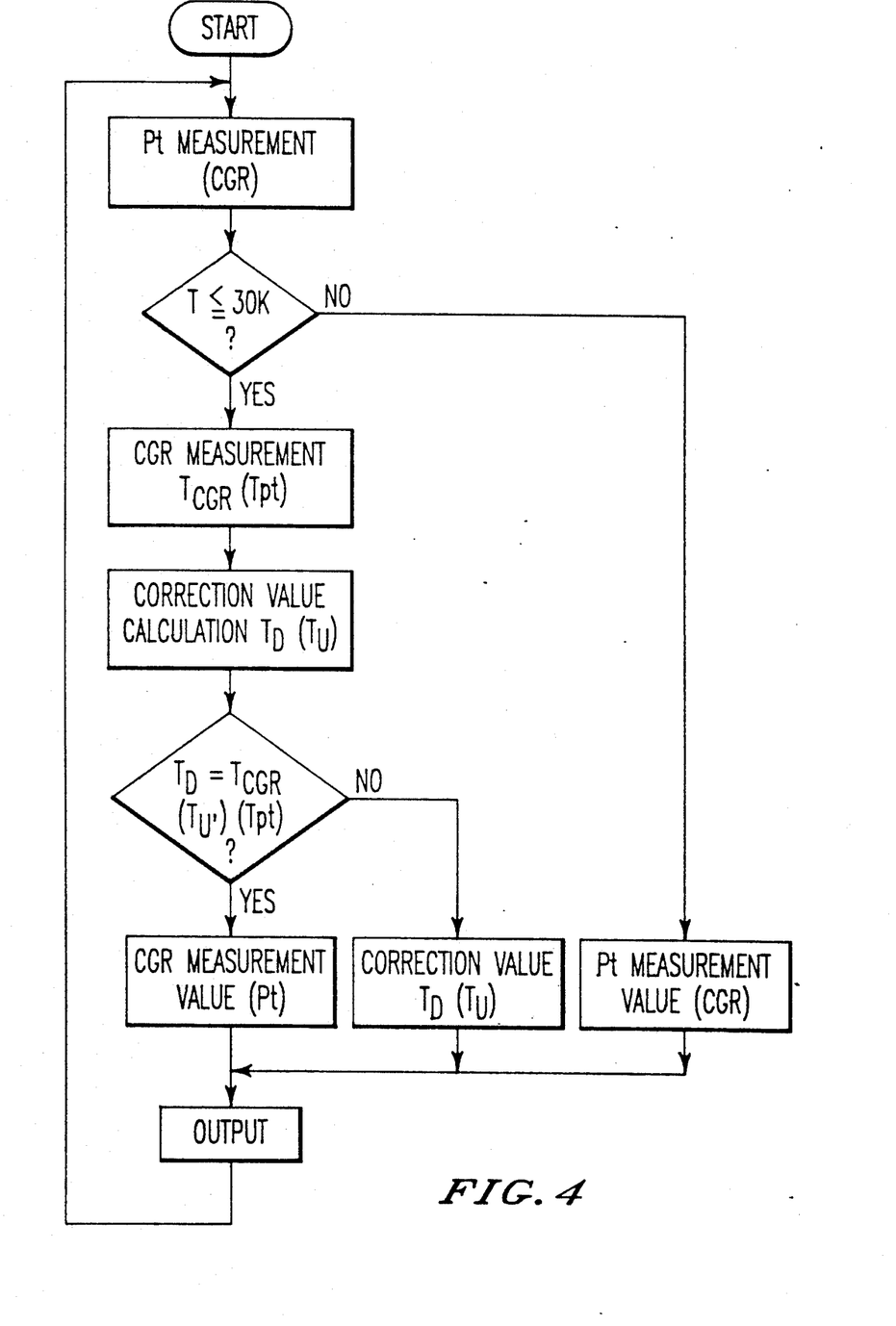
FIG. 4 is a flow chart illustrating the content of processing of a digital circuit employing a microprocessor.

FIG. 4 is a flow chart showing the correction action in the case of falling temperature. The items shown in brackets ( ) refer to the case of rising temperature. As described above, when changing over between different sensors, temperature measurement can be performed continuously by performing a correction action.

Figure 5:
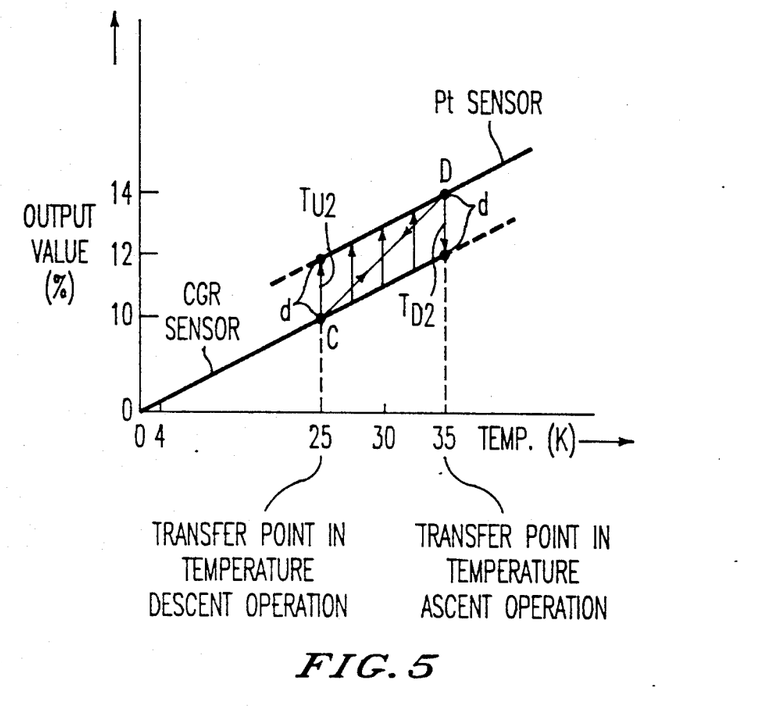
FIG. 5 is a diagram given in explanation of a correction action of the cryogenic temperature measurement equipment during temperature fall and during temperature rise different from the correction action of the equipment illustrated in FIG. 2.

Next, another method of correction processing will be described with reference to FIG. 1 and FIG. 5. The difference lies in the time point of changeover of the measurement circuit switch 7 i.e. the starting time point of the correction action. The description will concentrate on the parts which are different from the correction action of the cryogenic temperature measurement equipment of the first embodiment shown in FIG. 2. First of all, when the temperature is falling, an output value is output corresponding to the temperature measured by the Pt sensor 1 from room temperature down to 35 K. When the output value corresponding to the temperature measured by the Pt sensor 1 reaches the output value corresponding to 35 K., the measurement circuit switch 7 is transferred from α to β, so that measurement is also performed by means of the CGR sensor 1'. The output voltage corresponding to the temperature measured by the Pt sensor 1 at temperature 35 K. (point D) is converted to a digital voltage signal by means of the isolating amplifier circuit 6A, the measurement circuit switch 7 and the A/D converter 8. The digital circuit 9 inputs this digital voltage signal and converts it to T35Pt (%), which is the output value corresponding to this digital voltage signal.

Figure 2:
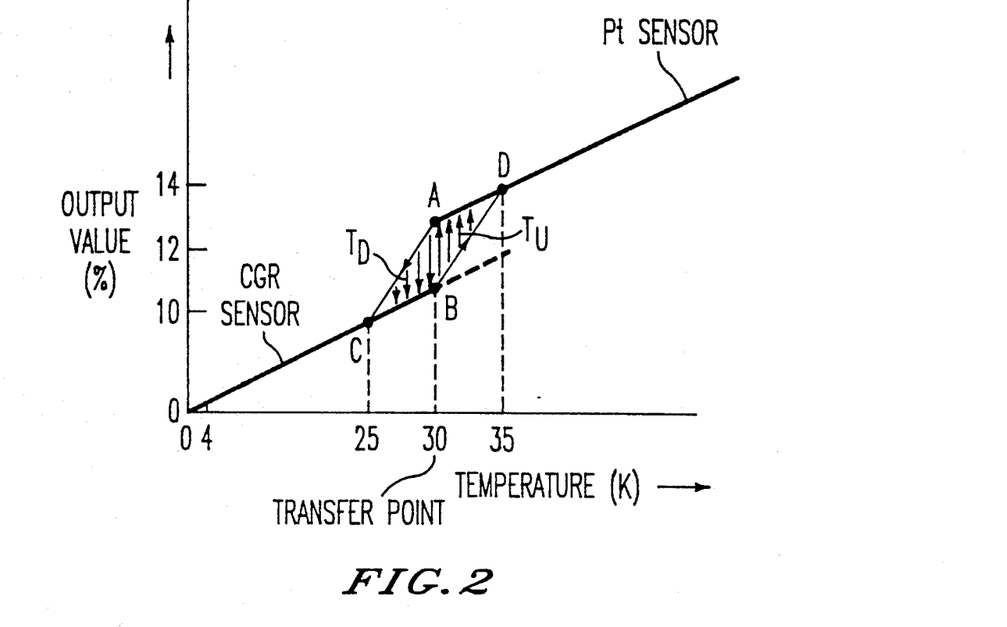
FIG. 2 is a diagram given in explanation of the correction action during falling temperature and during rising temperature of the cryogenic temperature measurement equipment illustrated in FIG. 1.
Figure 3:
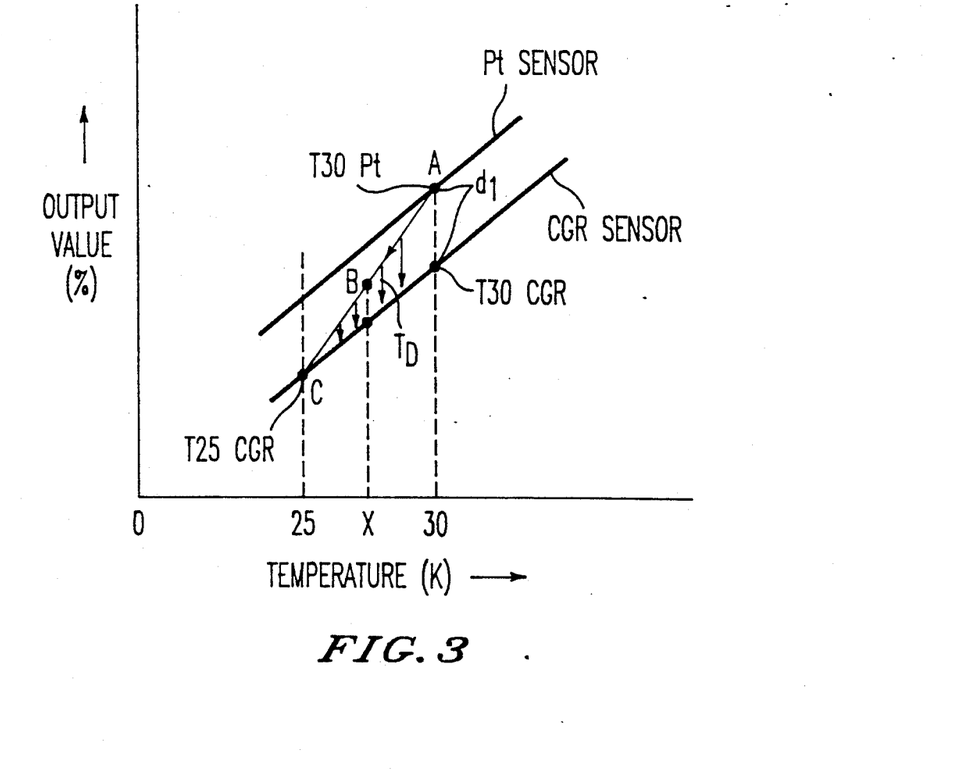
FIG. 3 is a diagram given in explanation of the detailed operation of the correction action during temperature fall of the very cryogenic temperature measurement equipment illustrated in FIG. 2.

As in the case of FIG. 2, the output value corresponding to the temperature measured by the CGR sensor 1' at this time point is designated as T35CGR (%). The difference in the two output values at this point is $$d3 = T35Pt - T35CGR.$$

If correction action is performed such as to make this difference d3 have a value of 0 from 35 K. to 25 K., the amount of change ΔT of the converter output with respect to temperature is:

$$\Delta T = \frac{T35Pt - T35CGR}{35 - 25}$$

The correction value changes with change in temperature, so it is calculated as follows by the CPU 9a in the digital circuit 9. If the correction value TD2 (%) at temperature X (K.) is represented by:

$$TD2 = \frac{(X - 25)(T35Pt - T35CGR)}{35 - 25} \qquad (3)$$

and the output value measured by the CGR sensor 1' at temperature X (K.) is TXCGR (%), the corrected output value TD2' (%) is expressed by:

$$TD2' = TXCGR + \frac{(X - 25)(T35Pt - T35CGR)}{35 - 25} \qquad (4)$$

During the interval from 35 K. (point D) to 25 K. (point C), the measurement circuit switch 7 of FIG. 1 is transferred alternately between α and β with a sampling period of about 100 ms, so that the values measured by the Pt sensor 1 and the CGR sensor 1' are read. The measured value of the Pt sensor 1 is corrected by means of correction value TD2 obtained by the above expression (3) so that it coincides with the measured value of the CGR sensor 1'. When the temperature 25 K. (point C) at which TD' = T25CGR in FIG. 5 is reached, the measurement circuit switch 7 transfers from α to β, so that subsequently measurement is made by the CGR sensor 1' up to the vicinity of 4 K. For example, if temperature X (K.) is 35 K., $$TD2' = T35CGR + \frac{10(T35Pt - T35CGR)}{10}$$
$$= T35Pt$$

If temperature X (K.) is 25 K., $$TD2' = T25CGR + 0$$
$$= T25CGR$$

The correction action on temperature rise will now be described. When the temperature is rising, in the opposite process to what happens when the temperature is falling, an output value is output corresponding to the temperature measured by the CGR sensor 1' from 4 K. up to 25 K. (point C). When the temperature measured by the CGR sensor 1' reaches a value corresponding to the temperature of 25 K. (point C), the measurement circuit switch 7 transfers from β to α, and measurement is performed by the Pt sensor 1 also. First of all, the output voltage corresponding to the temperature measured by the Pt sensor 1 at the temperature of 25 K. (point C) is converted to a digital voltage signal by means of the isolating amplifier circuit 6A, the measurement circuit switch 7 and the A/D converter 8. The digital circuit 9 inputs this digital voltage signal, and converts it to T25Pt (%), which is an output value corresponding to this digital voltage signal. In the same way, the output value corresponding to temperature measured by the CGR sensor 1' at this time point is designated as T25CGR (%). The difference between the two output values at this point is d4 = T25Pt − T25CGR.

If a correction action is performed such that this difference d4 is 0 between 35 K. and 25 K., the amount of change ΔT of the converter output with respect to temperature is:

$$\Delta T = \frac{T25Pt - T25CGR}{35 - 25}$$

The correction value changes with change in temperature, so it is calculated as follows by the CPU 9a of the digital circuit 9. If the correction value TU2 (%) at temperature X (k) is expressed by:

$$TU2 = \frac{(X - 35)(T25Pt - T25CGR)}{35 - 25} \quad (3)'$$

and the output value measured by the Pt sensor 1 at temperature X (K) is TXPt (%), the corrected output value TU2' (%) is expressed by:

$$TU2' = TXPt + \frac{(X - 35)(T25Pt - T25CGR)}{35 - 25} \quad (4)'$$

Between 25 K. and 35 K., the measurement circuit switch 7 of FIG. 1 transfers alternately between α and β with a sampling period of about 100 ms, and the values measured by the Pt sensor 1 and the CGR sensor 1' are read. Thus, the measured value of the CGR sensor 1' is corrected by the means of the correction value TU2 of expression (3)' above such that it coincides with the measured value of the Pt sensor 1. Thus, when the temperature of 35 K. (point D), at which TU2'=T35Pt in FIG. 5 is reached, the measurement circuit switch 7 transfers from β to α, so that subsequently measurement is effected by means of the Pt sensor 1 up to room temperature.

For example, if temperature X (K) is 25 K., $$TU2' = T25Pt + \frac{(25 - 35)(T25Pt - T25CGR)}{10}$$
$$= T25CGR$$

If temperature X (K) is 35 K., $$TU2' = T35Pt + 0$$
$$= T35Pt$$

In the cryogenic temperature measurement equipment described above, the Pt sensor and the CGR sensor were employed as the two types of sensor, but it would also be possible to employ for example a carbon resistance sensor, platinum cobalt resistance sensor, or a thermocouple sensor. Also, in the above description, the temperature of changeover of the sensors was set to the above-mentioned temperature, but it could be set to a temperature other than this. Furthermore, it would be possible to scan over the entire temperature range.

Figure 7:
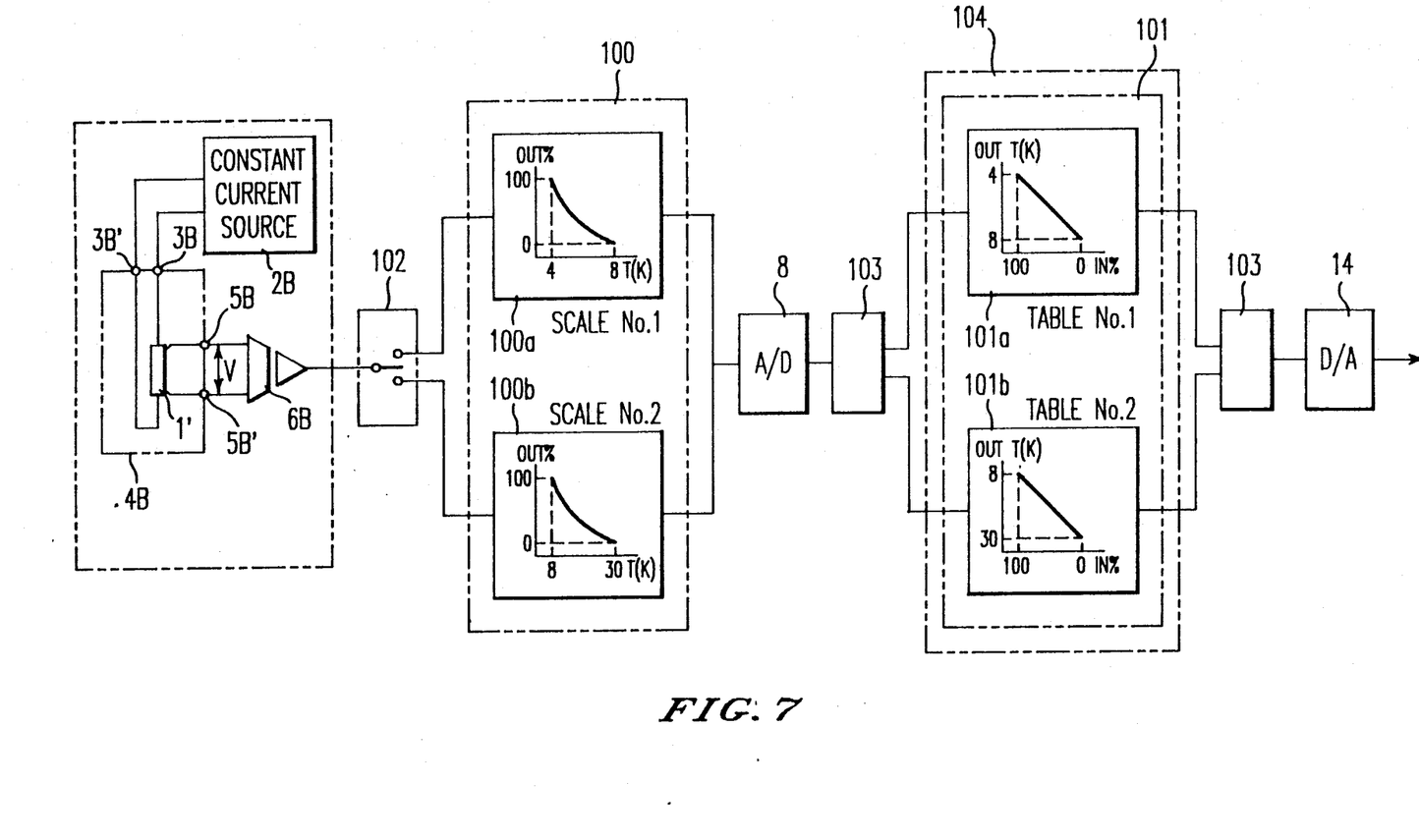
FIG. 7 is a processing schematic diagram of the cryogenic temperature measurement equipment that performs high-accuracy temperature measurement using a carbon glass sensor.
Figure 8:
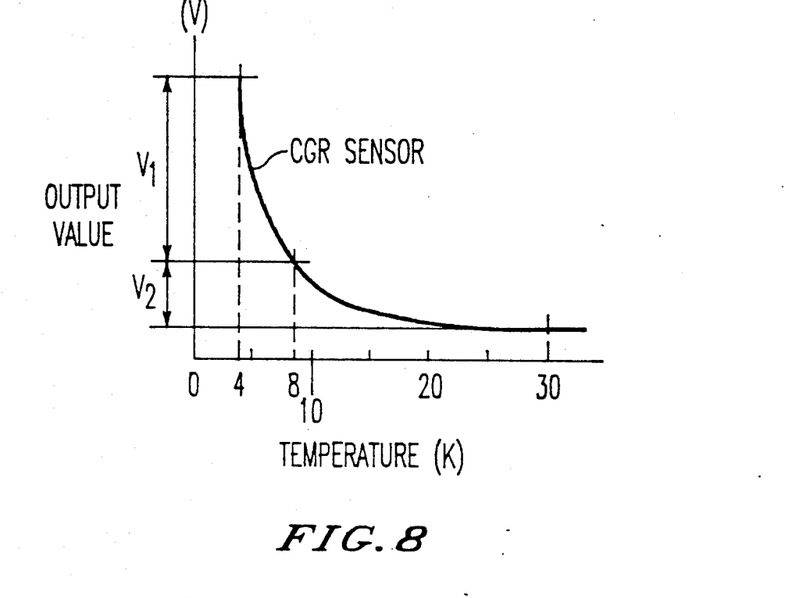
FIG. 8 is the characteristic curve of temperature output voltage of a carbon glass sensor.
Figure 9:
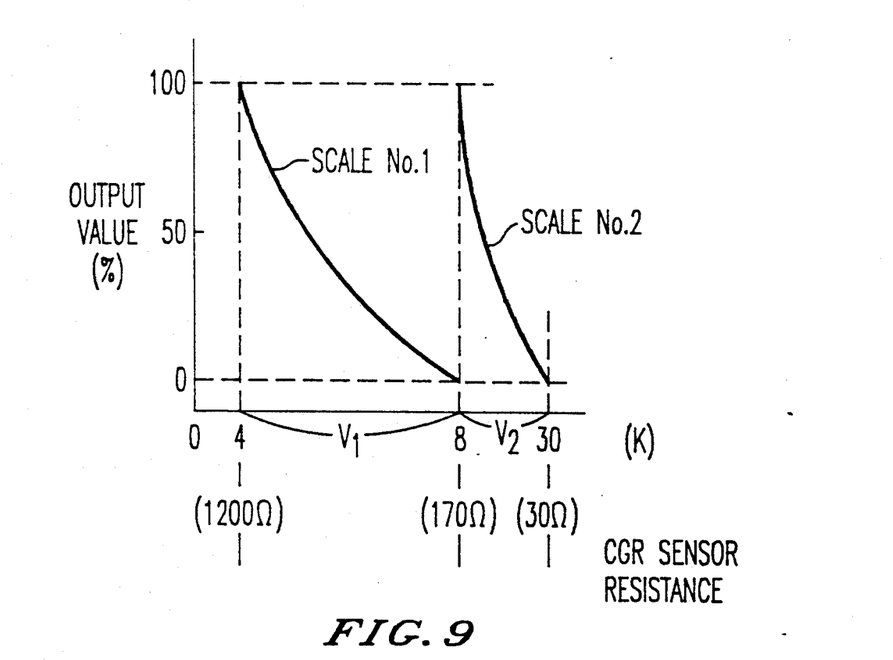
FIG. 9 is a characteristic curve showing the functions of scaling circuits.

Next, an embodiment of the invention consisting of a high-accuracy temperature measurement processing method for the CGR sensor will be described. The cryogenic temperature measurement equipment of this embodiment performs temperature measurement in the vicinity of 4.2 K. to measure the stability of superconducting wire mainly in the liquid helium temperature range. FIG. 7 is a schematic diagram of the cryognic temperature measurement equipment using the CGR sensor. In this measurement circuit, explanation of parts which are the same as those of the second measurement circuit 20 illustrated in the embodiment of FIG. 1 is omitted and the description will be chiefly concerned with those parts that are different. The interval from 4 K. to 30 K., which is the region of temperature measurement, as shown in FIG. 8, is divided into two temperature measurement regions, namely, from 4 K. to 8 K. and from 8 K. to 30 K. The output voltage from a isolating amplifier circuit 6B corresponding to the range from 4 K. to 8 K. is designated as V1, and the output voltage from the isolating amplifier circuit 6B corresponding to the range from 8 K. to 30 K. is designated as V2. Respective scaling circuits 100 and linearizing tables 101 are provided, corresponding to these two measurement regions.

As shown in FIG. 7, when the temperature measured by the CGR sensor 1' is above 8 K., scale transfer switch 102 transfers to the scale No. 1 100a in the scaling circuit 100 and, when the temperature is below 8 K., transfers to the scale No. 2 100b in the scaling circuit 100. The scaling circuit 100 scales the analog output voltage corresponding to the temperature measured by the CGR sensor 1' to between 0 to 100%. It is provided with the scale No. 1 100a and the scale No. 2 100b to be used separately for different measurement temperature ranges. The scale No. 1 100a scales the output voltage V1 in the range from 4 K. to 8 K. to an output value of 0 to 100%, and is adjusted to 100% at 4 K. and 0% at 8

K. The scale No. 2 100b scales the output voltage V2 in the range from 8 K. to 30 K. to an output value of 0 to 100%, and is adjusted to 100% at 8 K. and 0% at 30 K.

The A/D converter 8 converts the analog output value that is output from the scaling circuit 100 to a digital output value of prescribed resolution, for example, a resolution of 12 bit, for each measured temperature region. That is, it carries out respective resolution, in which the 0 to 100% output value corresponding to the output voltage V1 between 4 K. and 8 K. is resolved at 12 bit, and the 0 to 100% output value corresponding to the output voltage V2 between 8 K. and 30 K. is resolved at 12 bit. Table transfer switch 103 changes over to a table No. 1 101a in the linearizing table 101 provided in the microprocessor processing circuit 104 when the temperature measured by the CGR sensor 1' is below 8 K., and it changes over to a table No. 2 101b in the linearizing table 101 when the temperature is above 8 K. The microprocessor processing circuit 104 converts the digital output value resolved with a resolution of 12 bit that is output from the A/D converter 8 to a linearized value using the predetermined linearizing table 101. The linearizing table 101 includes the table No. 1 101a and the table No. 2 101b that are separately employed depending on the measured temperature range. These tables in the linearizing table 101 are produced by storing in the memory of the microprocessor processing circuit 104 the characteristic values of the temperature characteristic of the CGR sensor 1', for example by storing values obtained by linear approximation of the non-linearity of the CGR sensor 1' by the spline interpolation method in the form of a table. When the input value of the CGR sensor 1' coincides with a memory address of this table, the value stored at that address is read to outside. This read value is the value obtained by linearization processing.

The table No. 1 101a is employed when converting the output value that is output from the scale No. 1 100a of the scaling circuit 100 into a linearized value in the range 4 to 8 K. after digitizing by means of the A/D converter 8. The table No. 2 101b is employed to convert the output value that is output from the second scale of the scaling circuit 100 into a linearized value between 8 and 30 K. after digitization by the A/D converter 8. The D/A converter 14 turns the digital output value that is output from the linearizing table 101 back into an analog output value, converting it into a temperature value.

Next, the measurement processing of this embodiment will be described. When the temperature is falling from 30 K. to 4 K., first of all, from 30 K. up to 8 K., the scale transfer switch 102 is transferred to the scale No. 2 100b of the scaling circuit 100, and the table transfer switch 103 is transferred to the table No. 2 101b of the linearizing table 101. Output voltage V measured by voltage terminals 5B and 5B' of the CGR sensor 1', which is the measurement circuit for this purpose, is output as an output voltage amplified to a set level by means of the isolating amplifier circuit 6B. Then, analog output voltage V is scaled to a 0 to 100% output value corresponding to 30 to 8 K. in accordance with the scale No. 2 100b of the scaling circuit 100 by means of the scale transfer switch 102, and is converted to a digital output value by the A/D converter 8. This digital output value is then converted to a linearized value of 30 to 8 K. in accordance with the table No. 2 101b in linearizing table 101, converted to an analog output value by means of the D/A converter 14, and the temperature corresponding to this output value is read.

Next, when the temperature reaches 8 K., the scale transfer switch 102 changes the scale No. 2 100b of the scaling circuit 100 over to the scale No. 1 100a, and the table transfer switch 103 changes over from the table No. 2 101b in the linearizing table 101 to the table No. 1 101a. Thus the output voltage V measured by these voltage terminals 5B and 5B' of the CGR sensor 1' of the measurement circuit is converted and output as an output voltage amplified to a set level by means of the isolating amplifier circuit 6B. The analog output voltage is then scaled to a 0 to 100% output value corresponding to 8 to 4 K. in accordance with the equipment scale No. 1 100a of the scaling circuit 100, through the scale transfer switch 102, and is converted to a digital output value by the A/D converter 8. This digital output value is input to the table No. 1 101a in the linearizing table 101 to convert it to a 8 to 4 K. linearized value. This is then converted to an analog output value by the D/A converter 14, and the temperature corresponding to this output value is read.

Figure 13:
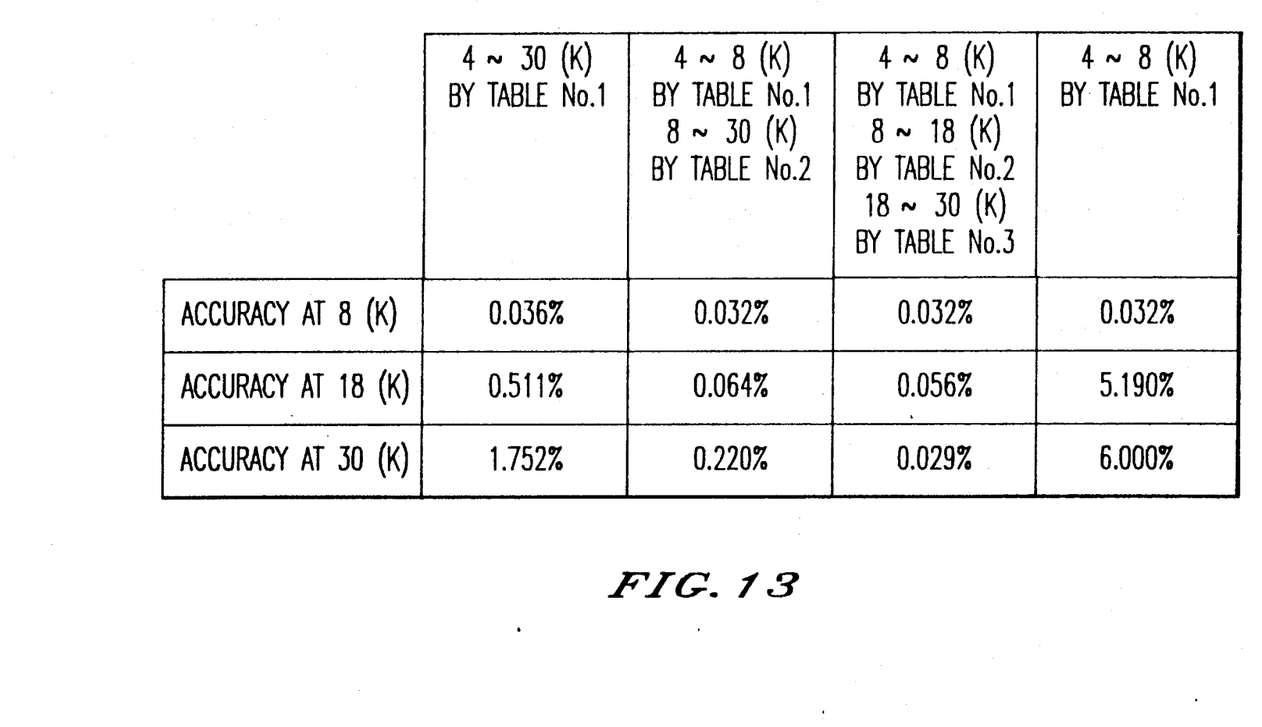
FIG. 13 is a temperature accuracy table obtained using the cryogenic temperature measurement equipment using a CGR sensor.

In the case or rising temperature, processing is performed which is the opposite of that performed in the case of falling temperature. Consequently, as shown in FIG. 13, the accuracy of measurement of temperature is 0.22% at 30 K., which is about eight times better then in the conventional case, where only one table was employed.

Figure 10:
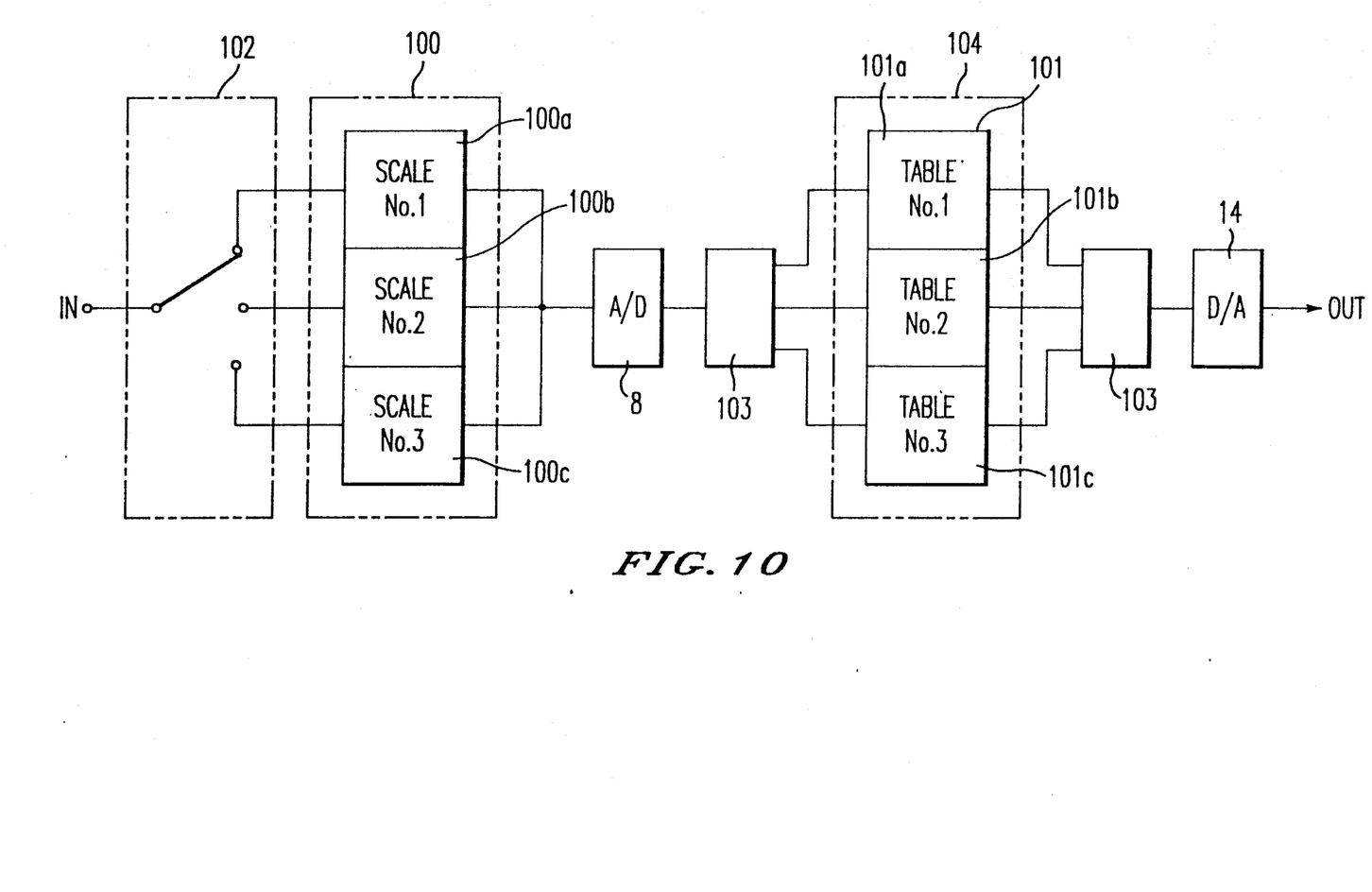
FIG. 10 is a diagram showing the processing schema of a second embodiment of the cryogenic temperature measurement equipment illustrated in FIG. 7.

FIG. 10 is a schematic diagram of the cryogenic temperature measurement equipment with a measurement circuit employing the CGR sensors, in which the measurement temperature region of the first embodiment i.e. from 4 to 30 K., is divided into three measurement regions, namely, from 4 to 8 K., from 8 to 18 K. and from 18 K. to 30 K. The following description will concentrate on its differences with the cryogenic temperature measurement equipments shown in FIG. 1 and FIG. 7.

Corresponding to the three measurement regions, scaling circuit 100 is provided with a scale No. 1 100a, a scale No. 2 100b, and a scale No. 3 100c, and a linearizing table 101 of the microprocessor processing circuit 104 is provided with a table No. 1 101a, a table No. 2 101b, and a table No. 3 101c. The scale No. 1 100a performs scaling on the analog output voltage V1 from 4 K. to 8 K. to obtain a 0 to 100% output value, which is adjusted to 100% at 4 K. and 0% at 8 K. The scale No. 2 100b scales the analog output voltage V2 in the interval 8 K. to 18 K. to an output value of 0 to 100%, which is adjusted to 100% at 8 K. and 0% at 18 K. The scale No. 3 100c scales the analog output voltage V3 from 18 K. to 30 K. to an output value of 0 to 100% which is adjusted to 100% at 18 K. and 0% at 30 K. The table No. 1 101a converts the output value that is output from the scale No. 1 100a of the scaling circuit 100 to a linearized value between 4 and 8 K. after digitization by the A/D converter 8. The table No. 2 101b converts the output value that is output from the scale No. 2 100b of the scaling circuit 100 to a linearized value between 8 and 18 K. after digitization by the A/D converter 8. The table No. 3 101c converts the output value that is output from the scale No. 3 100c of scaling circuit 15 into a linearized value between 18 and 30 K. after digitization by the A/D converter 8. The scale transfer switch 102 and the table transfer switch 103 effects changeover between the above-mentioned scales and tables at 8 K. and 18 K.

Figure 12:
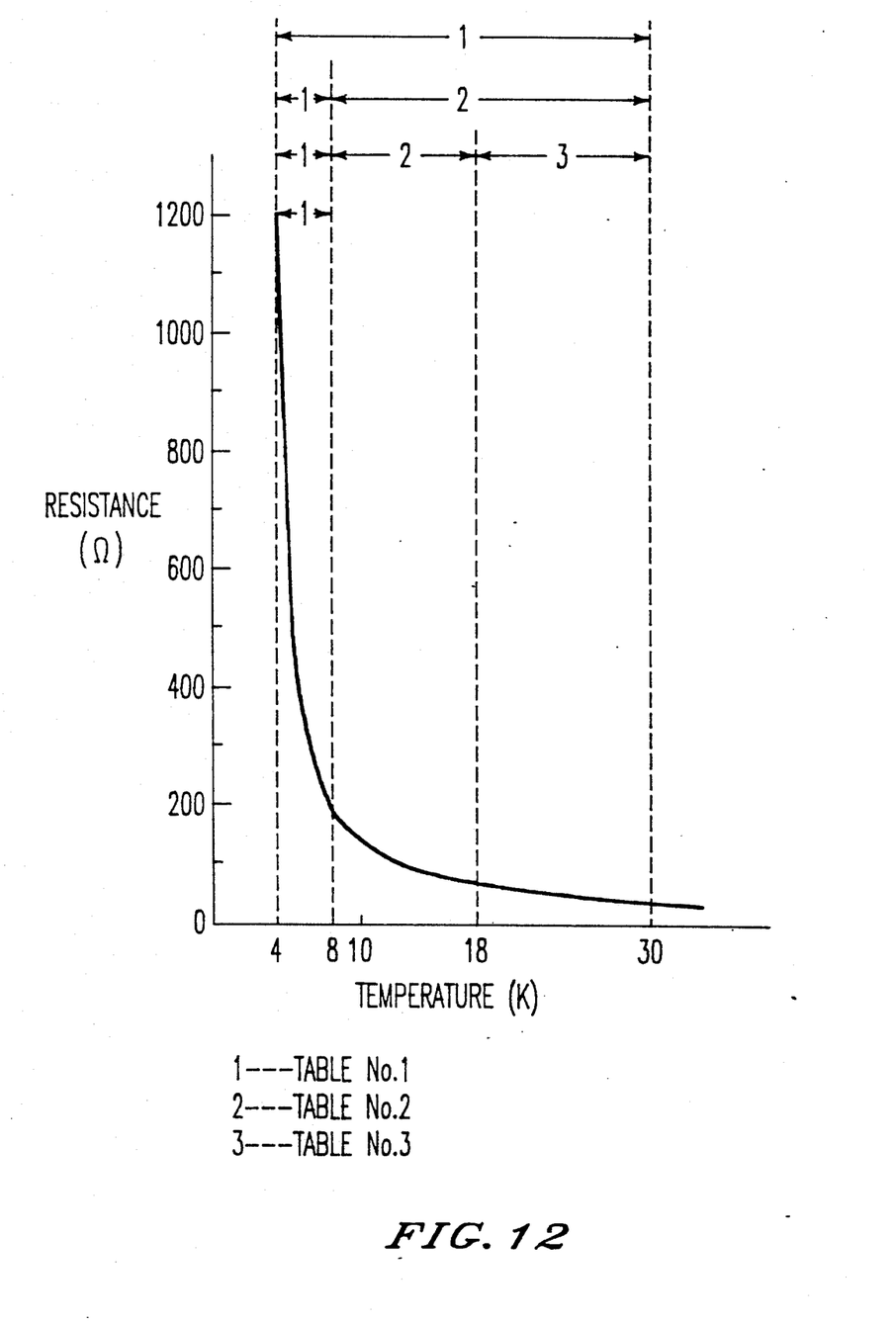
FIG. 12 is a diagram showing how the temperature measurement region of the CGR sensor is divided into a plurality of regions.

Operation when temperature is rising and when temperature is falling are the same as with the method of measurement of FIG. 7, and a description of them is omitted. By the above configuration, the accuracy is improved by about 19 times at 18 K. (0.056%) and about 60 times at 30 K. (0.029%) as compared with the case where the temperature is measured using a single table only, as shown in FIG. 12, and is improved by about 8 times as compared with the case where the measurement region temperature is measured with two tables.

Figure 11:
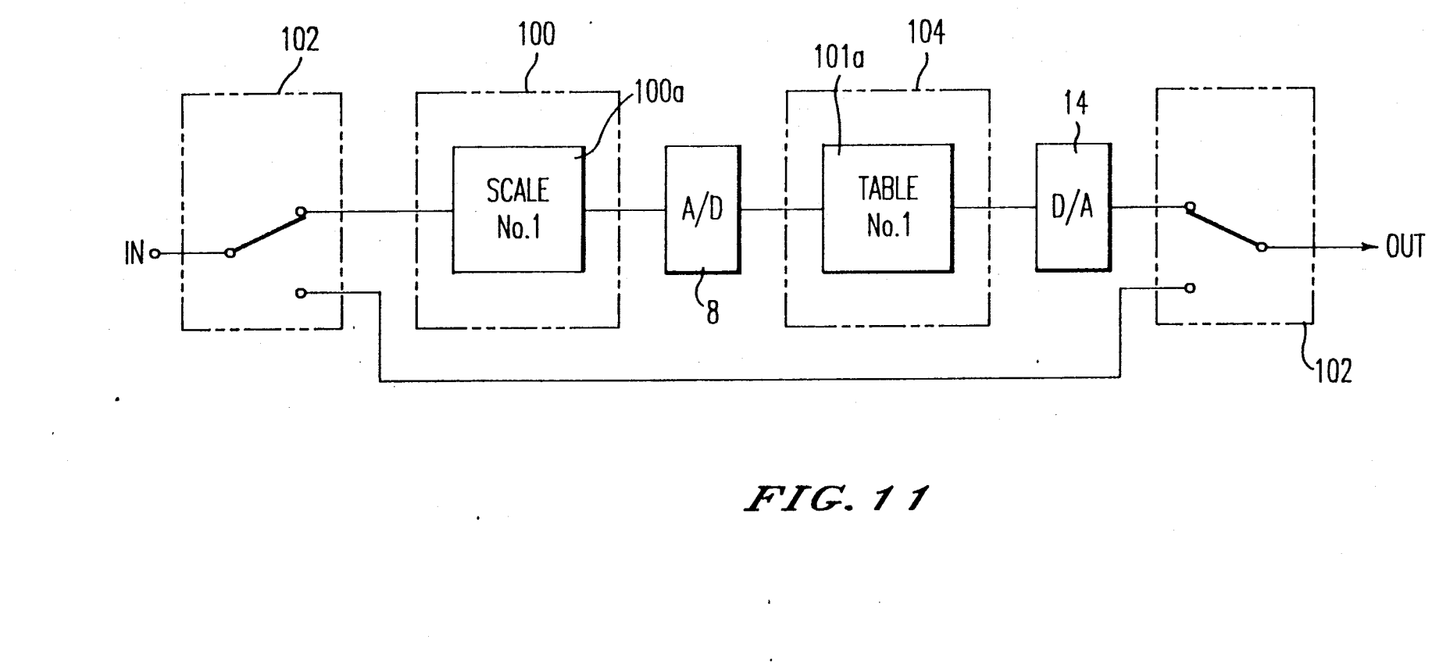
FIG. 11 is a processing schematic diagram of a third embodiment of the cryogenic temperature measurement equipment illustrated in FIG. 7.

FIG. 11 is a schematic diagram of the cryogenic temperature measurement equipment with a measurement circuit employing the CGR sensors wherein the 4 to 30 K. measurement temperature region of the first embodiment is divided into two measurement regions, namely, 4 to 8 K. and 8 to 30 K. The explanation concentrates on the differences between the cryogenic temperature measurement equipments of FIG. 1 and FIG. 7. For the interval from 4 to 8 K., there is provided the scale No. 1 100a in the scaling circuit 100; and the table No. 1 101a in the linearizing table 101 provided in the microprocessor processing circuit 104. The scale No. 1 100a scales the analog output voltage V1 between 4 and 8 K. to a 0 to 100% output value, which is adjusted to 100% at 4 K. and 0% at 8 K. The table No. 1 101a converts the output value that is output from the first scale of the scaling circuit 100 to a value that is linearized between 4 and 8 K., after digitization by the A/D converter 8. No particular linearization processing is performed between 8 and 30 K. The above method of measurement is employed in cases where accuracy is required only in a specified interval. For example, the critical temperature of NbTi used in superconductor materials is Tc=6.5 K., so this can be applied when there is no particular problem of accuracy of temperature measurement between 8 K. and 30 K., while raising the accuracy of measurement of temperature in the interval from 4 K. to 8 K.

FIG. 13 shows the temperature measurement accuracy from 4 K. to 30 K. obtained by the methods of measurement of embodiments 1 to 3 described above. In the cryogenic temperature measurement equipments of embodiments 1 to 3, the CGR sensor was employed. However, it would alternatively be possible to employ a carbon resistance, platinum cobalt resistance, or thermocouple sensor etc. Also, NbTi was mentioned as a superconducting material, but Nb$_3$Sn is another superconducting material which could be employed. The number of divisions of the measurement region is not restricted to those described above.

What is claimed is:

1. A temperature measurement system for measuring temperature over a wide range, comprising:
    first measurement means to measure the temperature in a first temperature region above a second predetermined temperature region, using a characteristic curve of a first temperature sensor;
    second measurement means to measure the temperature in a third temperature region below said second temperature region, using a characteristic curve of a second temperature sensor; and
    means for measuring the temperature in said second temperature region using a characteristic curve which is a function of the first and second temperature sensor characteristic curves and that connects the characteristic curve of said first measurement means with the characteristic curve of said second measurement means.

2. A temperature measurement equipment according to claim 1, wherein said second measurement means includes:
    a dividing means that divides the temperature region below the second temperature region into a plurality of sub-regions;
    digital processing means for digital processing of temperature measured by the second measurement means in each sub-region; and
    linear approximation means that performs a linear approximation on the output of the digital processing means.

3. A temperature measurement equipment according to claim 1, characterized in that said first measurement means comprises:
    a dividing means that divides the temperature region into a plurality of regions;
    digital processing means that performs digital processing with a pre-set resolution on the output measured by the measurement means in each temperature region divided by said dividing means to provide a digitally processed output; and
    linear approximation means that calculates a linear approximation to temperature using the digitally processed output, for each temperature region divided by said division means.

4. A temperature measurement equipment according to claim 1, wherein the first temperature sensor comprises a platinum sensor and the second temperature sensor comprises a carbon glass resistance sensor.

5. A temperature measurement equipment comprising:
    dividing means that divides a temperature region into a plurality of sub-regions;
    measurement means for measuring the temperature in each sub-region,
    digital processing means for digital processing of temperature measured by the measurement means; and
    linear approximation means that performs a linear approximation on the output of the digital processing means; and
    wherein for larger rates of change of the measurement output with respect to temperature change, said dividing means divides the temperature region into corresponding smaller temperature sub-regions.

6. A method of measuring temperature over a wide range, comprising:
    measuring temperature in a first temperature region above a pre-set temperature region using a first measuring means,
    measuring temperature in a second temperature region below the pre-set temperature region using a second measuring means;
    measuring temperature in the pre-set temperature region using a characteristic curve which is a function of the first and second measuring means and that connects the characteristic curve of the first measuring means with the characteristic curve of the second measuring means.

7. A method of measuring temperature over a wide range as in claim 6, further including:
    calculating the temperature in the pre-set temperature region using a first characteristic curve when the temperature is moving from the first region to the second region; and calculating the temperature is the pre-set temperature region using a second characteristic curve which is different from the first characteristic curve when the temperature is moving from the second temperature region to the first temperature region.

8. A method of measuring temperature over a wide range, comprising:

for declining temperature, measuring temperature above a first set point using a first measuring means that has a first characteristic curve, measuring temperature from a second set point below said first set point using a second measuring means that has a second characteristic curve; and calculating temperature between the first and second set points using a third characteristic curve which is a function of the first and second measuring means and that connects the characteristic curve of the first measuring means with the characteristic curve of the second measuring means; and for rising temperature, measuring temperature below said first set point using said second measuring means, measuring temperature above a third set point, which is higher than said first set point using the said first measuring means, and measuring temperature between the first and third set points using a fourth characteristic curve which is a function of the first and second measuring means and which connects the characteristic curve of the first measuring means with the characteristic curve of the second measuring means.

* * * * *

UNITED STATES PATENT AND TRADEMARK OFFICE
CERTIFICATE OF CORRECTION

PATENT NO. : 5,224,777
DATED : July 6, 1993
INVENTOR(S) : Soichiro Hayashi et al.

It is certified that error appears in the above-indentified patent and that said Letters Patent is hereby corrected as shown below:

On the title page, Item [30]: The second Foreign Application Priority Data has been omitted, please insert: --Mar. 12, 1992 [JP] Japan........ 4-088154--

Signed and Sealed this

Twenty-ninth Day of March, 1994

Attest:

BRUCE LEHMAN

*Attesting Officer*  *Commissioner of Patents and Trademarks*